United States Patent

Hindin

[15] 3,687,496
[45] Aug. 29, 1972

[54] RIVET PANEL FASTENER

[72] Inventor: Eugene Hindin, 1371 Panther Rd., Rydal, Pa. 19046

[22] Filed: May 26, 1971

[21] Appl. No.: 147,050

[52] U.S. Cl............287/189.36 D, 29/455, 29/509, 52/617, 85/37
[51] Int. Cl............................F16b 5/01, F16b 19/06
[58] Field of Search........85/39, 37, 4; 287/189.36 D; 29/509, 512, 455 LM; 52/617, 621, 622, 627; 151/41.72, 41.74

[56] References Cited

UNITED STATES PATENTS

| | | | |
|---|---|---|---|
| 2,607,447 | 8/1952 | Tuttle | 52/617 |
| 3,008,552 | 11/1961 | Cushman et al. | 29/455 LM X |
| 1,816,254 | 7/1931 | Heath | 85/37 X |
| 2,129,167 | 9/1938 | Cunnington | 85/39 UX |
| 2,822,764 | 2/1958 | Widman | 85/37 UX |

FOREIGN PATENTS OR APPLICATIONS

| | | | |
|---|---|---|---|
| 1,141,298 | 3/1957 | France | 85/39 |
| 826,586 | 1/1952 | Germany | 85/37 |
| 303,126 | 9/1929 | Great Britain | 85/37 |

*Primary Examiner*—Ramon S. Britts
*Attorney*—Thomas I. Davenport, Edward M. Farrell, John D. Sowell, Alford L. Trueax, Jr. and William R. Nolte

[57] ABSTRACT

A fastener for joining a laminated panel such as plywood to a structural member and to provide a moisture proof connection therebetween. The fastener includes a ferrule having a hollow shank portion with a transverse flange portion extending from one of the ends. The shank portion is received in aligned holes in the panel and structural member so that the flange portion seats on margins of the hole in the structural member. A rivet or softer material than the ferrule with a head at one of its ends is passed through the ferrule and its opposite end is swaged over the outwardly turned flange of the ferrule to make a flush connection. The hollow shank of the ferrule prevents the shank of the rivet of softer material from upsetting into the relatively soft interior of the panel.

1 Claim, 4 Drawing Figures

PATENTED AUG 29 1972

INVENTOR.
EUGENE HINDIN
BY William R. Nolte
AGENT

RIVET PANEL FASTENER

This invention relates to means for attaching panels having soft cores such as laminated plywood to structural members. More specifically this invention deals with the problem of attaching panels such as laminated plywood having relatively soft cores to structural members such as the upper and lower longitudinally extending side rails of the interior of a van or container. The laminated liners usually extend between the floor and the ceiling of the interior of the trailer and are fastened to vertically arranged spacer members which are attached to posts forming part of the side walls of the trailer. It has been found that when conventional rivet fasteners have been used in such constructions the rivets upon being headed are caused to be upset along their shank portions into the soft inner core of the wood thereby damaging the panels and reducing the overall strength of the side walls. Moreover such connections have been found to be of a non-moisture proof construction.

It is the principal object of this invention therefore to provide an improved fastener for securing a panel having a soft core to a structural member which avoids one or more of the disadvantages of prior art fasteners.

It is another important object of this invention to provide a fastener for securing a laminated sheet having a soft core to a structural member wherein the interior margins of the core surrounding the fastener are not damaged or otherwise enlarged by the fastener as the panel is secured in place.

It is still another object of this invention to provide a fastener for securing panels of laminated material having a deformable core section to a structural member in a manner so that the core material is not damaged by lateral expansion of the fastener and wherein a moisture proof connection is provided.

For a better understanding of the present invention, together with other and further objects thereof, reference is had to the following description taken in connection with the accompanying drawing.

Figure 1:
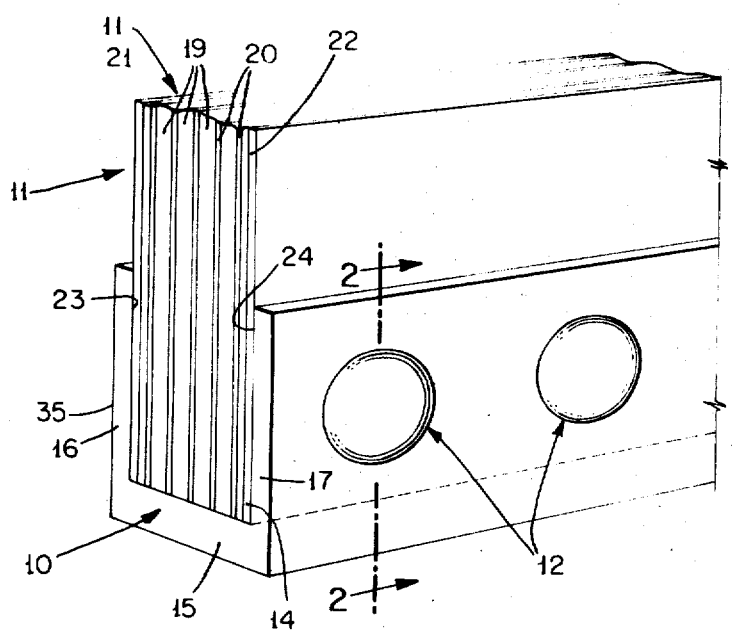
FIG. 1 is a view of a sheet or panel of laminated linear material shown with its base portion seated in a structural member having spaced apart flanges engaging the opposite faces of the panel and with the fastener of the present invention securing the panel.

Referring to FIG. 1 of the drawing, there is shown a structural member in the form of an aluminum extrusion 10 which may be for a refrigerated container or trailer van and having a laminated panel 11 such as plywood secured thereto. In accordance with the invention, a plurality of fastener means 2 are utilized to secure the lower marginal edge portion 14 of the panel so as to provide a substantially moisture proof connection therebetween.

Figures 2, 3:
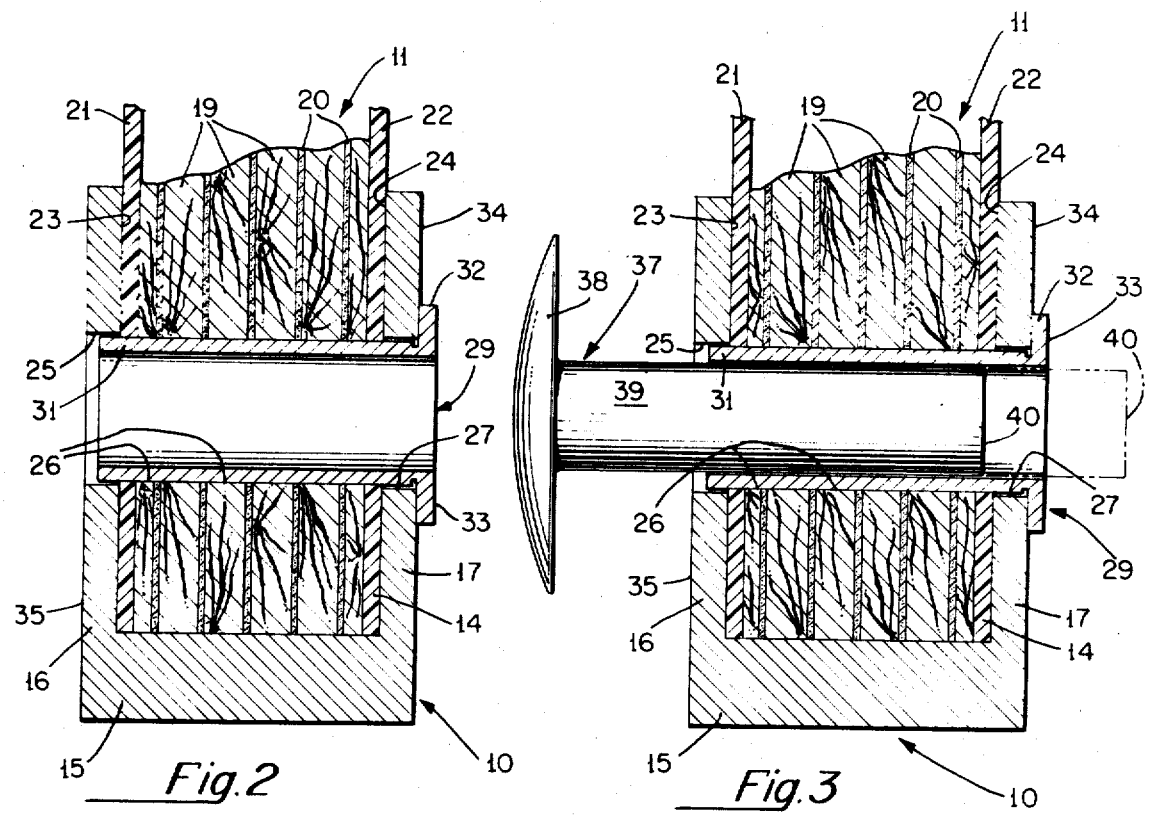
FIG. 2 is a sectional view taken through the panel and structural member showing a hollow sleeve member having a flange at one end inserted in aligned holes in the panel and structural member with the flange in engagement with structural member.
FIG. 3 is a view similar to FIG. 2 showing a rivet partially advanced into the hollow sleeve with its head portion adapted to engage an opposite face of the structural member.

As seen in FIG. 2 the structural member 10 by way of example, is shown as being channel-shaped in cross section having a base 15 and two upstanding spaced apart flanges 16, 17. The plyboard panel 11 is shown seated in the channel member between the latter flanges. The panel is shown as comprising a plurality of laminations 19 of wood suitably secured by layers of cement 20. In the present instance the outermost surfaces of the panel are made of thin sheets of fiberglass reinforced plastic material as indicated as at 21, 22, which make face contact with the inner surfaces 23, 24 of the respective upstanding flanges 16, 17. The latter flanges as well as the panel 11 are shown as including aligned holes 25, 26 and 27. In accordance with the present invention the fastening means 12 of the present invention is shown as including a hollow sleeve member 29 having a shank portion 31 and a flange 32 extending radially from the shank at one of its ends. The sleeve member in the present instance may be of a relatively hard material such as steel. The external diameter of the shank 31 conforms to the diameter of the holes 25, 26, 27 so as to fit snugly within the panel 11. The flange 32 of the sleeve member 29 extends radially outwardly and is of a diameter to exceed the hole size 27 to provide an overlap and to make good face contact with the external surface of flange 17. The length of the shank portion 21 is slightly less than the distance between outer face 33 of flange 17 and outer face 35 of flange 16 for a reason to be further explained.

With reference now to FIG. 3 a rivet 37 which may be of a soft material such as aluminum compared with the steel sleeve 29, is shown being entered into the hollow shank portion 31 of sleeve member 29. The rivet includes a head 38 and a shank portion 39, the latter having an outside diameter conforming to the inside diameter of sleeve portion 31 of the sleeve member 29. The length of the shank portion 39 is such as to extend beyond the flange 32 as indicated by the phantom line position of the end 40 of the rivet when the same is full advanced into the hollow sleeve member 29.

Figure 4:
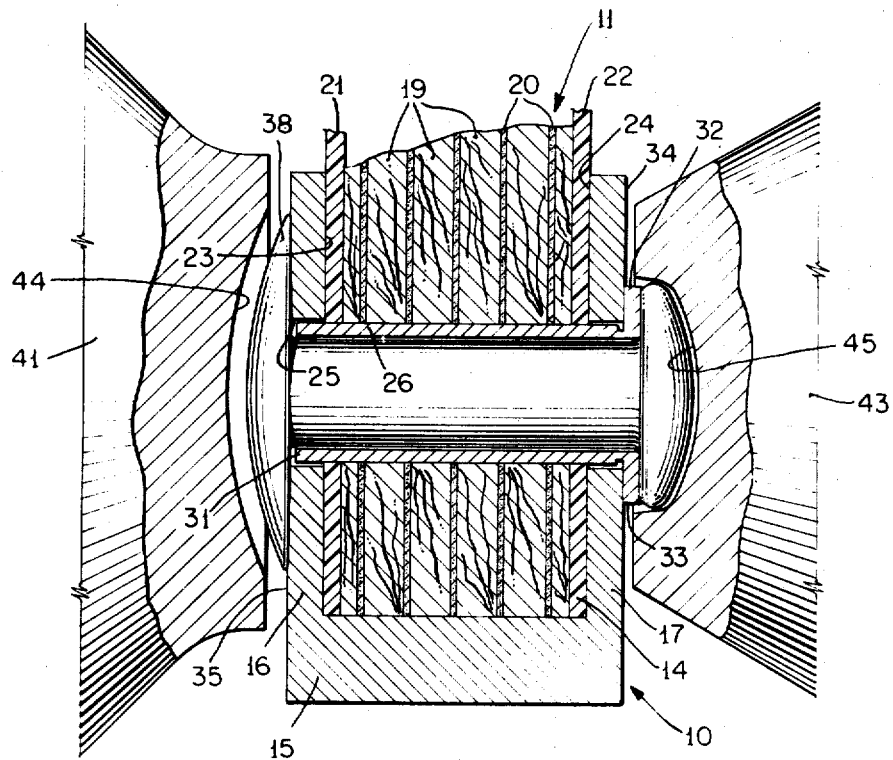
FIG. 4 shows the hollow sleeve and rivet assembly of FIG. 3 between a pair of opposed anvil members to provide the desired bucked shape of the rivet end.

With the fastener means 12 so assembled and before heading the rivet 37, suitable pressure is applied to the external surface 33, 35 of the structural member so as to squeeze flanges 16, 17 into tight sandwich engagement with the plyboard panel member 11. This may be done by placing the structural member 10 between suitable pressure pad apparatus which forms no part of the present invention. Under such pressure the length of the shank portion 21 of sleeve member 29 corresponds to the distance between the faces 33, 35 of structural member 10. While the pressure is so being applied to the flanges 16 and 17 to insure a tight interface with the flanges and the panel 11, the rivet assembly 12 is then placed between first and second anvil members 41 and 43. Anvil member 41 has a cavity 44 which conforms to the external shape of rivet head 38 while anvil 43 includes a cavity 45 which is shaped to provide the desired bucked shape of the protruding end 40 of shank 39. Still referring to FIG. 4 it is noted that the end 40 of the rivet 39 overlaps flange 32 of hollow sleeve member 29 so that the end is flush-headed with the outer surface of the flange. It is to be further noted that the aforementioned steel hollow sleeve member 29 prevents the shank portion 39 from being upset into the soft inner core of the plyboard panel 11 and provides a substantially moisture-proof connection between the panel and the structural member.

While there has been described what at present in consideration to be the preferred embodiment of this invention, it will be obvious to those skilled in the art that various changes and modifications may be made therein without departing from the invention, and it is aimed in the appended claims to cover all such changes and modifications as fall within the above described invention.

What is claimed is:

1. A rivet fastener in combination with a structural member and a stress panel having opposed outer layers of waterproof material and a relatively soft core material for providing a moisture seal with the member and stress panel while maintaining the core material free of physical distortion, both said stress panel and said structural member having substantially the same size aligned holes therein, said structural member having opposed flanges for receiving said stress panel therebetween, said fastener including a hollow steel sleeve member of substantially the same outer diameter as said aligned holes and extending therethrough, said sleeve member including a flange at one of its ends extending transverse to the axis of said member and engaging an outer surface of one flange of said structural member, an aluminum rivet having a shank portion extending within said sleeve member and including an enlarged end portion swaged into flush engagement with said flange at one end of said hollow sleeve member, the axial length of the sleeve member being less than the sum of the thicknesses of said panel and said structural member, and a head on said rivet adjacent the opposite end of said sleeve member engaging an outer surface of said opposed flange of said structural member and being axially spaced from said sleeve member, said inner surfaces of said flanges of said structural member forming a substantially waterproof seal with said opposed waterproof layers of said stress panel, said sleeve member serving as a rigid barrier between said rivet and said core material of said panel to prevent physical distortion of said core.

* * * * *